United States Patent
Chen

(10) Patent No.: US 9,078,323 B2
(45) Date of Patent: *Jul. 7, 2015

(54) HIGH EFFICIENCY LED DRIVER AND DRIVING METHOD THEREOF

(71) Applicant: Silergy Semiconductor Technology (Hangzhou) LTD, Hangzhou, ZheJiang Province (CN)

(72) Inventor: Wei Chen, Saratoga, CA (US)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/274,910

(22) Filed: May 12, 2014

(65) Prior Publication Data

US 2014/0246985 A1    Sep. 4, 2014

Related U.S. Application Data

(63) Continuation of application No. 13/737,207, filed on Jan. 9, 2013, now Pat. No. 8,773,041.

(30) Foreign Application Priority Data

Jan. 16, 2012   (CN) .......................... 2012 1 0012098

(51) Int. Cl.
| | |
|---|---|
| *H05B 37/02* | (2006.01) |
| *H05B 39/02* | (2006.01) |
| *H05B 39/04* | (2006.01) |
| *H05B 41/36* | (2006.01) |
| *H05B 33/08* | (2006.01) |

(52) U.S. Cl.
CPC ........ *H05B 33/0842* (2013.01); *H05B 33/0812* (2013.01); *H05B 33/0809* (2013.01)

(58) Field of Classification Search
None
See application file for complete search history.

(56) References Cited

U.S. PATENT DOCUMENTS

| | | | |
|---|---|---|---|
| 8,773,041 B2* | 7/2014 | Chen | 315/291 |
| 2007/0024213 A1* | 2/2007 | Shteynberg et al. | 315/291 |
| 2010/0090607 A1 | 4/2010 | Vos | |
| 2012/0326618 A1 | 12/2012 | Kim | |

* cited by examiner

*Primary Examiner* — Anh Tran
(74) *Attorney, Agent, or Firm* — Michael C. Stephens, Jr.

(57) ABSTRACT

The present invention relates to a high efficiency LED driver, and driving methods thereof. In one embodiment, a high efficiency LED driving method can include: (i) receiving an AC input voltage to obtain an absolute value thereof; (ii) receiving a DC bus voltage, and driving the LED device through a power switch; (iii) generating a first reference voltage according to a driving current and an expected driving current; (iv) comparing the absolute value against a sum of a driving voltage and the first reference voltage; (v) when the absolute value is greater than the sum of the driving voltage and the first reference voltage, turning off the power switch; and (vi) when the absolute value is greater than the driving voltage but less than the sum of the driving voltage and the first reference voltage, turning on the power switch to generate an output current.

13 Claims, 6 Drawing Sheets

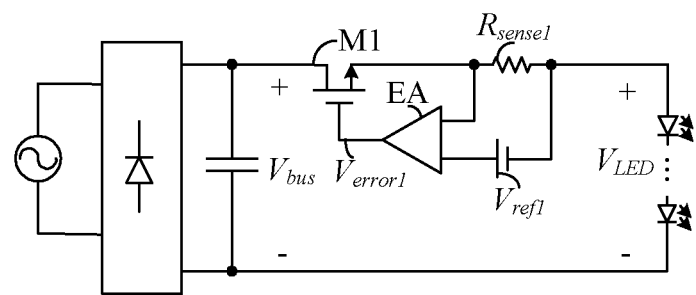
FIG. 1A (conventional)

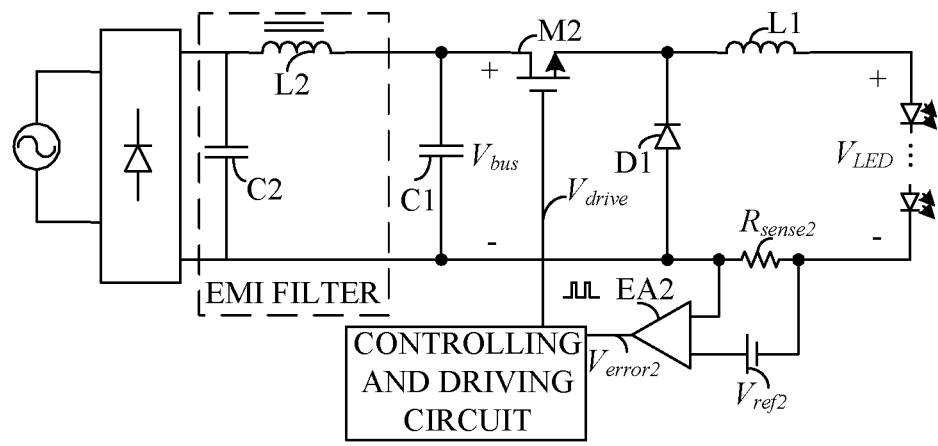
FIG. 1B (conventional)

HIGH EFFICIENCY LED DRIVER AND DRIVING METHOD THEREOF

This application is a continuation of the following application, U.S. patent application Ser. No. 13/737,207, filed on Jan. 9, 2013, now issued as U.S. Pat. No. 8,773,041, and which is hereby incorporated by reference as if it is set forth in full in this specification, and which also claims the benefit of Chinese Patent Application No. 201210012098.3, filed on Jan. 16, 2012, which is incorporated herein by reference in its entirety.

FIELD OF THE INVENTION

The present invention relates to the field of semiconductor technology, and more specifically to a high efficiency light-emitting diode (LED) driver, and driving methods thereof.

BACKGROUND

Along with increasing innovation and development in the illumination industry, and increasing importance of energy savings, light-emitting diode (LED) lighting technology is developing fast as a revolutionary lighting technology. Because the luminance of LEDs is related to the luminous intensity, which is proportional to the current and forward voltage of LEDs, and may change due to temperature variation, a constant current source may be utilized for driving LEDs. Thus, to achieve a good reliability and a good luminous intensity, an appropriate LED driver is an important part of the overall design. Without a good LED driver, inherent advantages of LED technology may not be fully realized.

SUMMARY

In one embodiment, a high efficiency driving method for an LED device can include: (i) receiving an AC input voltage to obtain an absolute value of the AC input voltage; (ii) receiving a DC bus voltage, and generating a driving voltage and a driving current for the LED device through a power switch, where the DC bus voltage can be obtained by rectifying the AC input voltage; (iii) generating a first reference voltage according to the driving current and an expected driving current of the LED device; (iv) comparing the absolute value of the AC input voltage against the sum of the driving voltage and the first reference voltage; (v) when the absolute value of the AC input voltage is greater than the sum of the driving voltage and the first reference voltage, turning off the power switch; and (vi) when the absolute value of the AC input voltage is greater than the driving voltage but less than the sum of the driving voltage and the first reference voltage, turning on the power switch to generate an output current, where the average value of the output current substantially matches the expected driving current.

In one embodiment, a high efficiency LED driver can include: (i) a power switch coupled to a output capacitor, where the power switch is configured to receive a DC bus voltage, and to generate a driving voltage and a driving current for an LED device; and the DC bus voltage is obtained from an AC input voltage through a rectifier bridge; (ii) a AC input voltage detector configured to receive the AC input voltage, and to obtain an absolute value of the AC input voltage; (iii) a feedback controller configured to generate a first reference voltage according to the driving current and an expected driving current of the LED device; (iv) a first comparator coupled to the AC input voltage detector and the feedback controller, where the first comparator is configured to compare the absolute value of the AC input voltage against a sum of the first reference voltage and the driving voltage, and to generate a driving signal for the power switch; (v) when the absolute value of the AC input voltage is greater than the sum of the first reference voltage and the driving voltage, the first comparator is configured to turn off the power switch; and (vi) when the absolute value of the AC input voltage is greater than the driving voltage but less than the sum of the first reference voltage and the driving voltage, the first comparator is configured to turn on the power switch to generate an output current to maintain average value of the output current that substantially matches the expected driving current.

Embodiments of the present invention can advantageously provide several advantages over conventional approaches. For example, a high efficiency LED driving method configured for an LED device can adjust the output current according to a relationship of the input voltage and the driving voltage of the LED device, so that power losses can be reduced to achieve maximum operating efficiency. Also, the circuit structure can be simplified to lower product costs and overall circuit size. Other advantages of the present invention may become readily apparent from the detailed description of preferred embodiments below.

BRIEF DESCRIPTION OF THE DRAWINGS

FIG. 1A is a schematic diagram of an example conventional LED driver using a linear regulator.

FIG. 1B is a schematic diagram of an example conventional LED driver using a switching regulator.

DETAILED DESCRIPTION

Figure 2A:
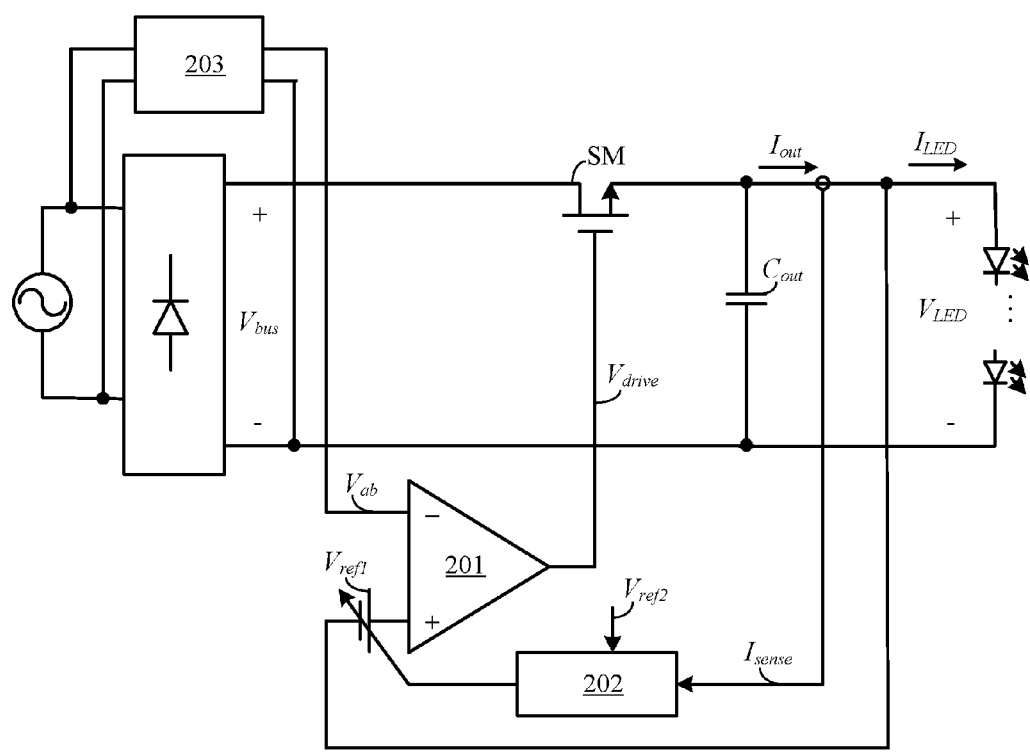
FIG. 2A is a schematic diagram of a first example high efficiency LED driver in accordance with embodiments of the present invention.

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Traditionally, there are two types of power regulators for driving light-emitting diodes (LEDs): linear regulators and switching regulators. In FIG. 1A, shown is a schematic diagram of an example conventional LED driver using linear regulator. The LED driver can include first power switch M1, error amplifier EA, and sampling resistor $R_{sense1}$. The output current of power switch M1 can be detected by sampling resistor $R_{sense1}$, the detected value can be compared with reference voltage $V_{ref1}$, and the error between the detected value and reference voltage $V_{ref1}$ can be amplified by error amplifier EA to obtain error signal $V_{error1}$. Power switch M1 can be used to receive DC bus voltage $V_{bus}$ and error signal $V_{error1}$, and to generate a nearly constant output voltage and a nearly constant output current to drive LEDs.

By utilizing a linear regulator, the example LED driver may have an easier circuit structure with fewer components to reduce the product cost. However, the efficiency of the LED driver may be sacrificed. For example, if the LED driver is configured in a universal input AC voltage with a range of from about 90V to about 265V, the rectified DC bus voltage may range from about 120V to about 375V. Thus, the driving voltage for LEDs should be lower than a minimum DC bus voltage (e.g., about 120V), and when the input AC voltage is about 265V (or the DC bus voltage is about 375V), the power losses can be substantial, and can result in an efficiency lower than about 35%.

FIG. 1B shows a schematic diagram of an example conventional LED driver using switching regulator. In this example, power switch M2, inductor L1, and diode D1 can be used to form a buck topology. The LED current can be detected by sampling resistor $R_{sense2}$, and the detected value can be used to compare against a reference voltage $V_{ref2}$. Error signal $V_{error2}$ can be obtained according to the detected value and reference voltage $V_{ref2}$. A controlling and driving circuit can be used to receive error signal $V_{error2}$, and to generate a driving signal for power switch M2.

Power switch M2 can be controlled to output an almost constant output voltage and an almost constant output current to drive LEDs. The advantage of this type of LED driver is that the efficiency is close to 100% in theory if the conduction losses in power switch M2 and the magnetic components (e.g., inductor L1) are neglected. However, because the operating frequency of switching regulator can be very high, an electromagnetic interference (EMI) filter may be utilized. Thus, one disadvantage is that more components are needed for this type LED driver than the linear regulator, increasing overall costs and circuitry size.

Embodiments of the present invention can advantageously provide several advantages over conventional approaches. For example, a high efficiency LED driving method configured for an LED device can adjust the output current according to a relationship of the input voltage and the driving voltage of LED device, such that power losses can be reduced to achieve maximum operating efficiency. Also, the circuit structure can be simplified to lower the production costs and overall circuit size.

FIG. 2A shows a schematic diagram of a first example high efficiency LED driver in accordance with embodiments of the present invention. This example LED driver can include power switch SM, output capacitor $C_{out}$, comparator 201, feedback controller 202, and AC input voltage detector 203. Power switch SM can be coupled between a first terminal of DC bus voltage $V_{bus}$ and a first terminal of an LED device. For example, DC bus voltage $V_{bus}$ can be obtained from the input AC voltage through a rectifier bridge.

Output capacitor $C_{out}$ can be parallel coupled to the LED device, and also coupled between a second power terminal of power switch SM and a second terminal of DC bus voltage $V_{bus}$. AC input voltage detector 203 can be used to receive the AC input voltage, and to obtain an absolute value $V_{ab}$ of the AC input voltage. Feedback controller 202 can be used to receive LED current sampling signal $I_{sense}$ and reference voltage $V_{ref2}$, and to generate an adjustable reference voltage $V_{ref1}$. For example, reference voltage $V_{ref2}$ can be used to represent an expected driving current.

Comparator 201 can connect to AC input voltage detector 203 at its inverting terminal to receive absolute value $V_{ab}$ of the AC input voltage. Comparator 201 can also receive a sum of driving voltage $V_{LED}$ and reference voltage $V_{ref1}$ at its non-inverting terminal. An output terminal of comparator 201 can be coupled to a control terminal of power switch SM, and the state of power switch SM can be controlled by driving signal $V_{drive}$.

When the absolute value $V_{ab}$ of AC input voltage is greater than the sum of driving voltage $V_{LED}$ and reference voltage $V_{ref1}$, comparator 201 can be used to turn off power switch SM. When absolute value $V_{ab}$ of AC input voltage is greater than driving voltage $V_{LED}$, but less than the sum of driving voltage $V_{LED}$ and reference voltage $V_{ref1}$, comparator 201 can be used to turn on power switch SM to generate output current $I_{out}$. For example, the average value of output current $I_{out}$ can substantially match the expected driving current.

Figure 2B:
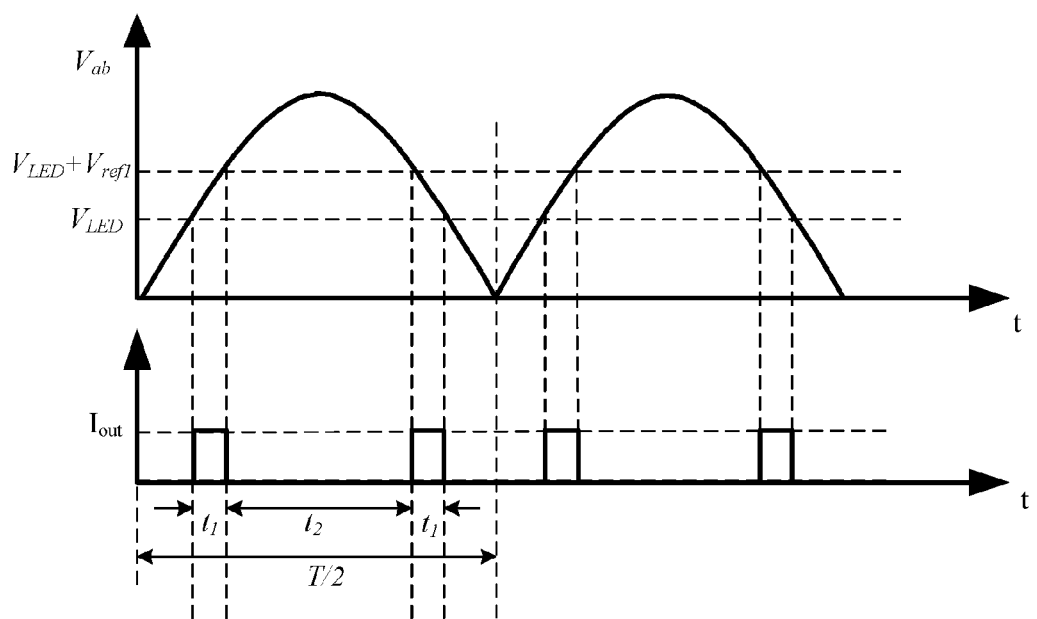
FIG. 2B is a waveform diagram of an example operation of the example high efficiency LED driver shown in FIG. 2A.

FIG. 2B shows a waveform diagram of example operation of the example high efficiency LED driver shown in FIG. 2A. The following will describe the operation process of the LED driver shown in FIG. 2A in conjunction with the waveform diagram shown in FIG. 2B.

When absolute value $V_{ab}$ of the AC input voltage is greater than the sum of driving voltage $V_{LED}$ and reference voltage $V_{ref1}$, comparator 201 can be used to turn off power switch SM, and the LED driver may stop generating output current $I_{out}$. When absolute value Vab of AC input voltage is greater than driving voltage $V_{LED}$, but less than the sum of driving voltage $V_{LED}$ and reference voltage $V_{ref1}$, comparator 201 can be used to turn on power switch SM to generate output current $I_{out}$. During half of the switching cycle T/2, output current $I_{out}$ can last for 2×$t_1$. Because reference voltage $V_{ref1}$ can be used to represent an error between driving current $I_{LED}$ and the expected driving current, the average value of output current $I_{out}$ can substantially match with the expected driving current by regulating reference voltage $V_{ref1}$. When absolute value $V_{ab}$ of AC input voltage is less than driving voltage $V_{LED}$, the LED driver may be disabled and output current $I_{out}$ may be substantially zero.

By adopting an LED driver as exemplified in FIG. 2A, when the DC bus voltage (e.g., input voltage) is relatively small, power switch SM can be turned on, and a certain output current $I_{out}$ can be generated in a certain time period $t_1$. Because length of the time period can be used to represent the error between the driving current and the expected driving current, an average value of the output current can be regulated to substantially match with the expected driving current, and thus to meet LED device driving requirements. On the other hand, when absolute value $V_{ab}$ of AC input voltage is relative large, power switch SM can be turned off. Thus, the efficiency of the LED driver in FIG. 2A can be much higher than a conventional LED driver using a linear regulator.

Assuming driving voltage $V_{LED}$ is about 120V, peak value $V_{pk}$ of DC bus voltage $V_{bus}$ may be about 240V, and driving current $I_{LED}$ can be about 100 mA. for the LED driver using a linear regulator shown in FIG. 1A, the efficiency can be obtained as shown in equation 1.

$$\eta_1 = \frac{V_{LED}}{V_{bus}} = 50\% \qquad (1)$$

However, for the example LED driver shown in FIG. 2A, assuming reference voltage $V_{ref1}$ is about 2.4V, driving current $I_{LED}$ can be as shown below in equation 2.

$$\frac{I_{out} \times (2 \times t_1)}{T/2} \approx I_{LED} \quad (2)$$

Equation 3 can be obtained by slightly changing equation 2 as shown below.

$$\frac{4 \times I_{out} \times t_1}{T} \approx I_{LED} \quad (3)$$

Thus, input power $P_{in}$ can therefore be obtained as shown below in equation 4.

$$P_{in} \approx \frac{4 \times I_{out} \times t_1}{T} \times \left(V_{LED} + \frac{V_{ref1}}{2}\right) \approx I_{LED} \times \left(V_{LED} + \frac{V_{ref1}}{2}\right) \quad (4)$$

Also, the operating efficiency of this example LED driver may be determined as shown below in equation 5.

$$\eta_2 = \frac{V_{LED} \times I_{LED}}{P_{in}} = \frac{V_{LED}}{V_{LED} + V_{ref1}/2} \approx 99\% \quad (5)$$

Because reference voltage $V_{ref1}$ is far less than driving voltage $V_{LED}$, the operating efficiency can approach 100%. Thus, the example regulator can achieve much higher efficiency than the traditional linear regulator.

If the conduction current of power switch SM is too large, a current limiter can be series connected between the rectifier bridge and power switch SM to limit the conduction current of power switch SM. Also, in order to reduce the harmonic content in the conduction current of power switch SM, a wave-shaping circuit can be series connected between the rectifier bridge and power switch SM to shape the conduction current of power switch SM. People skilled in the art will recognize that the current limiter and wave-shaping circuit functions can be implemented by any other appropriate circuit. In addition, in the LED driver shown in FIG. 2A, power switch SM can be implemented by a MOSFET transistor or any other appropriate transistor, and feedback controller can also be implemented by any other appropriate circuit.

Figure 3:
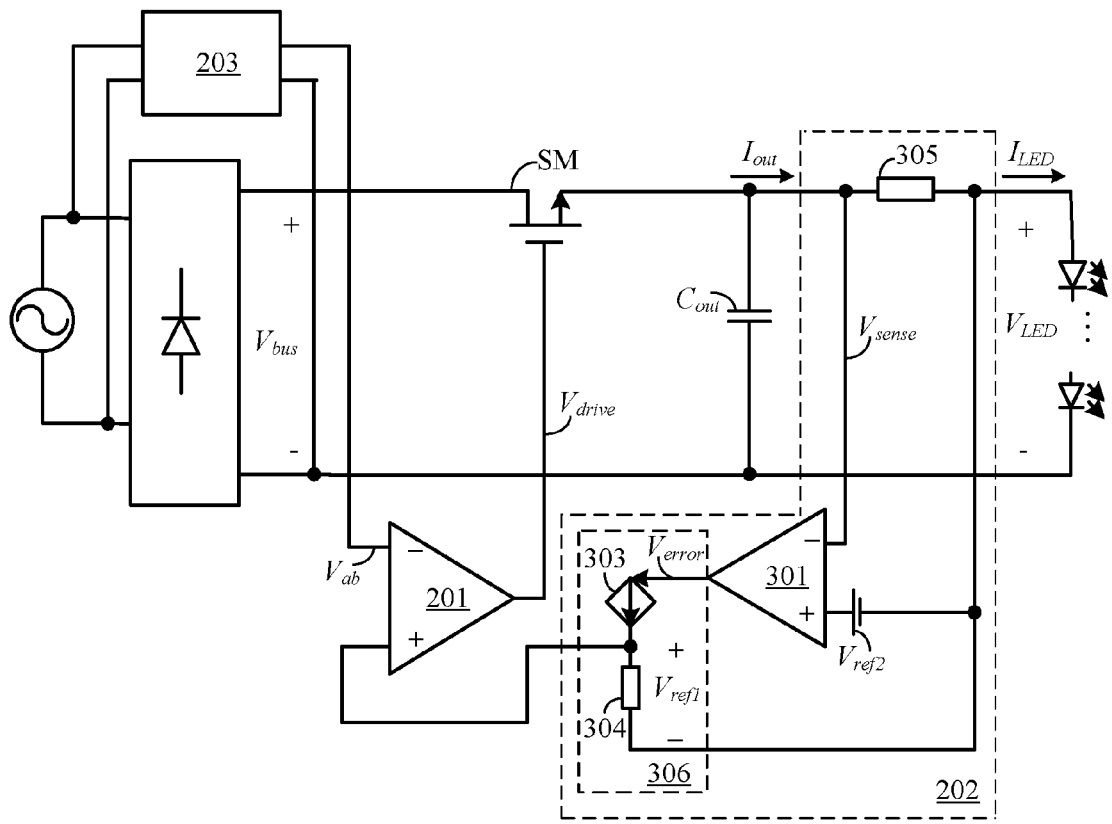
FIG. 3 is a schematic diagram of a second example high efficiency LED driver in accordance with embodiments of the present invention.

With reference to FIG. 3, shown is a schematic diagram of a second example high efficiency LED driver in accordance with embodiments of the present invention. Based on the LED driver shown in FIG. 2A, feedback controller 202 can include detector 305, error amplifier 301, and reference voltage generator 306. For example, reference voltage generator 306 can be formed by controllable current source 303 and resistor 304. Detector 305 can be coupled between a first terminal of output capacitor $C_{out}$ and the LED device to detect driving current $I_{LED}$, and to generate LED current sense voltage $V_{sense}$.

Error amplifier 301 can connect to detector 305 at its inverting terminal, and may receive a sum of reference voltage $V_{ref2}$ and driving voltage $V_{LED}$. For example, reference voltage $V_{ref2}$ can be used to represent an expected driving current of the LED device. Also, error amplifier 301 can be used to calculate an error between LED current sense voltage $V_{sense}$ and the sum of reference voltage $V_{ref2}$ and driving voltage $V_{LED}$ to obtain error controlling signal $V_{error}$. Thus, error controlling signal $V_{error}$ can be used to represent a difference between driving current $I_{LED}$ and expected driving current.

Also, error controlling signal $V_{error}$ can be used to control the output current of controllable current source 303. The voltage across resistor 304 obtained by the output current of controllable current source 303 flowing through resistor 304 can be used as reference voltage $V_{ref1}$. Also, the sum of reference voltage $V_{ref1}$ and driving voltage $V_{LED}$ can be provided to first comparator 201.

An example operating process of the LED driver in FIG. 3 can be described as in the following. When absolute value $V_{ab}$ of the AC input voltage is greater than the sum of driving voltage $V_{LED}$ and reference voltage $V_{ref1}$, comparator 201 can be used to turn off power switch SM. Thus, the LED driver may stop generating output current $I_{out}$, and power losses can essentially be zero when the input voltage is relative large because of the zero output current.

When absolute value $V_{ab}$ of AC input voltage is greater than driving voltage $V_{LED}$, but less than the sum of driving voltage $V_{LED}$ and reference voltage $V_{ref1}$, the error between LED current sense voltage $V_{sense}$ and the sum of reference voltage $V_{ref2}$ and driving voltage $V_{LED}$ can be calculated. When $V_{sense} > V_{LED} + V_{ref2}$, which means driving current $I_{LED}$ is greater than the expected driving current, error controlling signal $V_{error}$ generated by error amplifier 301 can be reduced. Thus, the output current of controllable current source 303 and reference voltage $V_{ref1}$ across resistor 304 can both be consequently reduced. As shown in FIG. 2B, time period $t_1$ for generating output current $I_{out}$ may be less when reference voltage $V_{ref1}$ is reduced. Thus, the average value of output current $I_{out}$ may also be reduced, and driving current $I_{LED}$ can be reduced to substantially match with the expected driving current.

When $V_{sense} > V_{LED} + V_{ref2}$, which means driving current $I_{LED}$ is less than the expected driving current, error controlling signal $V_{error}$ generated by error amplifier 301 can be increased. Thus, the output current of controllable current source 303 and reference voltage $V_{ref1}$ across resistor 304 can both be consequently increased. In contrast to the above-described condition, time period $t_1$ for generating output current $I_{out}$ may be larger to increase the average value of output current $I_{out}$. As the adjustable reference voltage $V_{ref1}$ can be used to represent the difference between driving current $I_{LED}$ and the expected driving current, the average value of output current $I_{out}$ can be regulated to substantially match the expected driving current by regulating reference voltage $V_{ref1}$.

In the example LED driver shown as FIG. 3, detector 305 can be implemented by resistors or other components or circuit blocks with the same or similar functions. Power switch SM can be implemented by a MOSFET transistor or any other appropriate transistor. Also, reference voltage generator 306 can be implemented by any other appropriate adjustable voltage generator.

Figure 4:
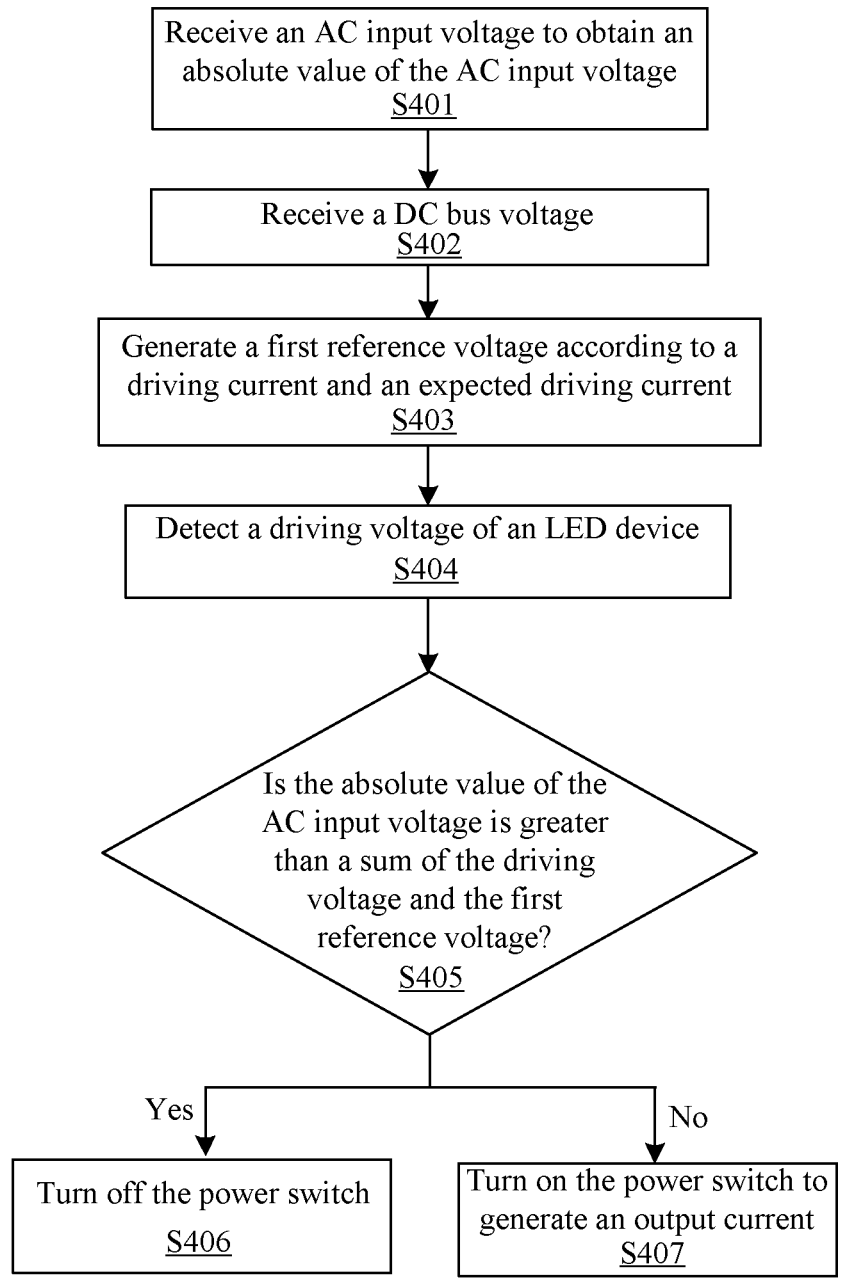
FIG. 4 is a flow diagram of an example high efficiency LED driving method in accordance with embodiments of the present invention.

The following will describe an example high efficiency LED driving method according to embodiments of the present invention, in conjunction with FIG. 4. FIG. 4 shows a flow diagram of one example high efficiency LED driving method in accordance with embodiments of the present invention.

At S401, an AC input voltage can be received, and an absolute value of the AC input voltage can be detected. At S402, a DC bus voltage can be received. Also, a driving voltage and a driving current for an LED device can be generated through a power switch. For example, the DC bus voltage can be obtained by rectifying the AC input voltage. At S403, a first reference voltage can be generated according to the driving current and the expected driving current of the LED device. At S404 the driving voltage of the LED device can be detected.

At S405, the absolute value of the AC input voltage can be compared against the sum of the driving voltage and the first reference voltage. At S406, when the absolute value of the AC input voltage is greater than the sum of the driving voltage and the first reference voltage, the power switch can be turned off. At S407, when the absolute value of the AC input voltage is greater than the driving voltage, but less than the sum of the driving voltage and the first reference voltage, the power switch can be turned on generate an output current. For example, the average value of the output current can substantially match with the expected driving current of the LED device.

The regulating method of the first reference voltage can also include detecting the driving current of the LED device, and calculating an error between the driving current and the expected driving current to obtain an error controlling signal. When the driving current is less than the expected driving current, the first reference voltage can be increased by the error controlling signal. Also, when the driving current is greater than the expected driving current, the first reference voltage can be reduced by the error controlling signal.

The detecting method of the driving current can also include utilizing a detector to sample the driving current and to obtain an LED current sense signal, and calculating an error between the LED current sense signal and the sum of a second reference voltage and the driving voltage to obtain the error controlling signal. For example, the second reference voltage can be used to represent the expected driving current.

The regulating method of the first reference voltage can also include controlling a controllable current source according to the error controlling signal, and charging a resistor with the controllable current source. For example, the voltage across the resistor can be utilized as the first reference voltage.

If the conduction current of the power switch is too large for a given application, the conduction current of the power switch can be limited. Also, in order to reduce the harmonic content in the conduction current of the power switch, the conduction current waveform of the power switch can be shaped.

By applying the above-described LED driving method, when DC bus voltage is relatively small, a certain output current can be generated through a power switch in a certain time period. Thus, the average value of the output current can substantially match the expected driving current as well as driving requirements of the LED device by regulating the length of the time period. In contrast, when the DC bus voltage is relative large, the power switch can be turned off. Therefore, the efficiency of the LED driver with this method can be much higher than a corresponding LED driver that utilises a linear regulator.

It can be concluded that, with the example high efficiency LED driver and driving method, the output current can be adjusted according to the relationship between input and driving voltages. As such, power losses can be reduced to achieve maximum operating efficiency. Further, the circuit structure can be simplified to lower production costs and overall circuit size.

The above described particular example LED drivers and driving methods in accordance with embodiments of the present invention. As people skilled in the art will recognize, any other appropriate circuit structures, methods, and/or components can also be utilized in particular embodiments.

The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of driving a light-emitting diode (LED) device, the method comprising:
   a) generating an absolute value of an AC input voltage;
   b) generating a driving voltage and a driving current for said LED device through a power switch;
   c) generating a reference voltage based on said driving current and an expected driving current of said LED device;
   d) comparing said absolute value of said AC input voltage against a sum of said driving voltage and said reference voltage;
   e) turning off said power switch when said absolute value of said AC input voltage is greater than said sum of said driving voltage and said reference voltage; and
   f) turning on said power switch to generate an output current when said absolute value of said AC input voltage is greater than said driving voltage and less than said sum of said driving voltage and said reference voltage.

2. The method of claim 1, further comprising:
   a) detecting said driving current of said LED device;
   b) generating an error controlling signal by determining an error between said driving current and said expected driving current;
   c) increasing said reference voltage by said error controlling signal when said driving current is less than said expected driving current; and
   d) reducing said reference voltage by said error controlling signal when said driving current is greater than said expected driving current.

3. The method of claim 2, further comprising:
   a) controlling a controllable current source based on said error controlling signal; and
   b) providing current through a resistor by said controllable current source, wherein a voltage across said resistor is configured as said reference voltage.

4. The method of claim 1, further comprising limiting a conduction current of said power switch.

5. The method of claim 1, further comprising shaping a conduction current waveform of said power switch.

6. A light-emitting diode (LED) driver, comprising:
   a) a power switch coupled to an output capacitor, wherein said power switch is configured to receive a DC bus voltage, and to generate a driving voltage and a driving current for an LED device;
   b) an AC input voltage detector configured to determine an absolute value of an AC input voltage;
   c) a feedback controller configured to generate a reference voltage based on said driving current and an expected driving current of said LED device;
   d) a comparator configured to compare said absolute value of said AC input voltage against a sum of said reference voltage and said driving voltage, and to generate a driving signal for said power switch;
   e) said comparator being configured to turn off said power switch when said absolute value of said AC input voltage is greater than said sum of said reference voltage and said driving voltage; and
   f) said comparator being configured to turn on said power switch to generate an output current when said absolute value of said AC input voltage is greater than said driving voltage and less than said sum of said reference voltage and said driving voltage.

7. The LED driver of claim 6, wherein said feedback controller comprises:
 a) a detector coupled between said output capacitor and said LED device, wherein said detector is configured to detect said driving current;
 b) an error amplifier configured to generate an error controlling signal based on an error between said driving current and said expected driving current; and
 c) a reference voltage generator configured to generate said reference voltage based on said error controlling signal.

8. The LED driver of claim 7, wherein:
 a) said reference voltage generator comprises a controllable current source and a resistor;
 b) said error controlling signal is configured to control an output current of said controllable current source; and
 c) said output current of said controllable current source is configured to flow through said resistor to generate said reference voltage.

9. The LED driver of claim 6, further comprising a current limiter coupled between said power switch and said rectifier bridge, wherein said current limiter is configured to limit a conduction current of said power switch.

10. The LED driver of claim 6, further comprising a wave-shaping circuit coupled between said power switch and said rectifier bridge, wherein said wave-shaping circuit is configured to shape a conduction current waveform of said power switch to reduce harmonic content.

11. The LED driver of claim 6, wherein said LED driver is configured to be disabled when said absolute value of said AC input voltage is less than said driving voltage.

12. The LED driver of claim 6, wherein said reference voltage is configured to be adjustable to represent a difference between said driving current and said expected driving current.

13. The LED driver of claim 6, wherein said power switch and said output capacitor are coupled in series to receive said DC bus voltage, and said LED device is coupled in parallel with said output capacitor.

* * * * *